United States Patent [19]
Wojciechowski et al.

[11] Patent Number: 5,963,389
[45] Date of Patent: Oct. 5, 1999

[54] TAPE TRANSPORT SYSTEM USING VARIABLE TAPE SPEED TO ACHIEVE CONSTANT DATA SPEED AND ADVANCE DETECTION AND CORRECTION OF TRACKING ERRORS TO REDUCE DATA LOSS ERRORS

[75] Inventors: Matthew Peter Wojciechowski, Louisville; Joe Kent Jurneke, Brighton, both of Colo.

[73] Assignee: Storage Technology Corporation, Louisville, Colo.

[21] Appl. No.: 08/907,181

[22] Filed: Aug. 8, 1997

Related U.S. Application Data

[63] Continuation of application No. 08/547,061, Oct. 23, 1995, abandoned.

[51] Int. Cl.⁶ .................................................... G11B 21/04
[52] U.S. Cl. ...................... 360/70; 360/73.09; 360/77.14
[58] Field of Search ............................. 360/73.09, 77.12, 360/77.13, 77.14, 21, 70, 76, 53; 242/334, 334.2

[56] References Cited

U.S. PATENT DOCUMENTS

| | | | |
|---|---|---|---|
| 2,938,962 | 5/1960 | Konins et al. | 360/76 |
| 3,051,797 | 8/1962 | Johnson | 360/76 |
| 4,014,040 | 3/1977 | Kornhaas | 360/70 X |
| 4,263,625 | 4/1981 | Warren | 360/70 X |
| 5,402,956 | 4/1995 | Lemke | 242/352.2 |

OTHER PUBLICATIONS

Matsushita Electric Industrial Co, Ltd., Audio and Video Systems Division; Technical Guide, vol. 1–2, AJ–D350.

*Primary Examiner*—Alan Faber
*Attorney, Agent, or Firm*—Duft, Graziano & Forest, P.C.

[57] ABSTRACT

The tape transport system acquires telemetry information pertaining to the tape medium at a position in advance of the associated tape segment passing over the movable read head. The advance telemetry information includes tape motion and position information which is used to identify both physical defects in the tape medium and misalignment of the tape medium with respect to the movable read head. The advance telemetry information are used to adjust the tape speed and the position of the movable read head with respect to the tape medium as the tape moves ahead to encounter the read head. This compensation can significantly reduce the data loss errors induced by tape speed and tape tracking errors.

17 Claims, 7 Drawing Sheets

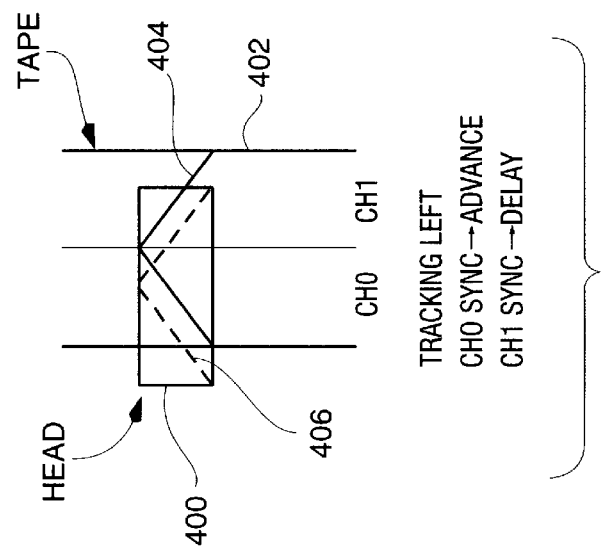
FIG. 4
*PRIOR ART*
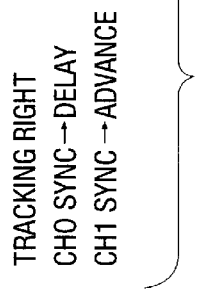
FIG. 4C
TRACKING RIGHT
CH0 SYNC→DELAY
CH1 SYNC→ADVANCE
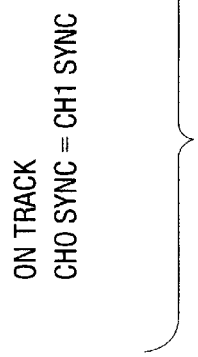
FIG. 4B
ON TRACK
CH0 SYNC = CH1 SYNC
FIG. 4A
TRACKING LEFT
CH0 SYNC→ADVANCE
CH1 SYNC→DELAY

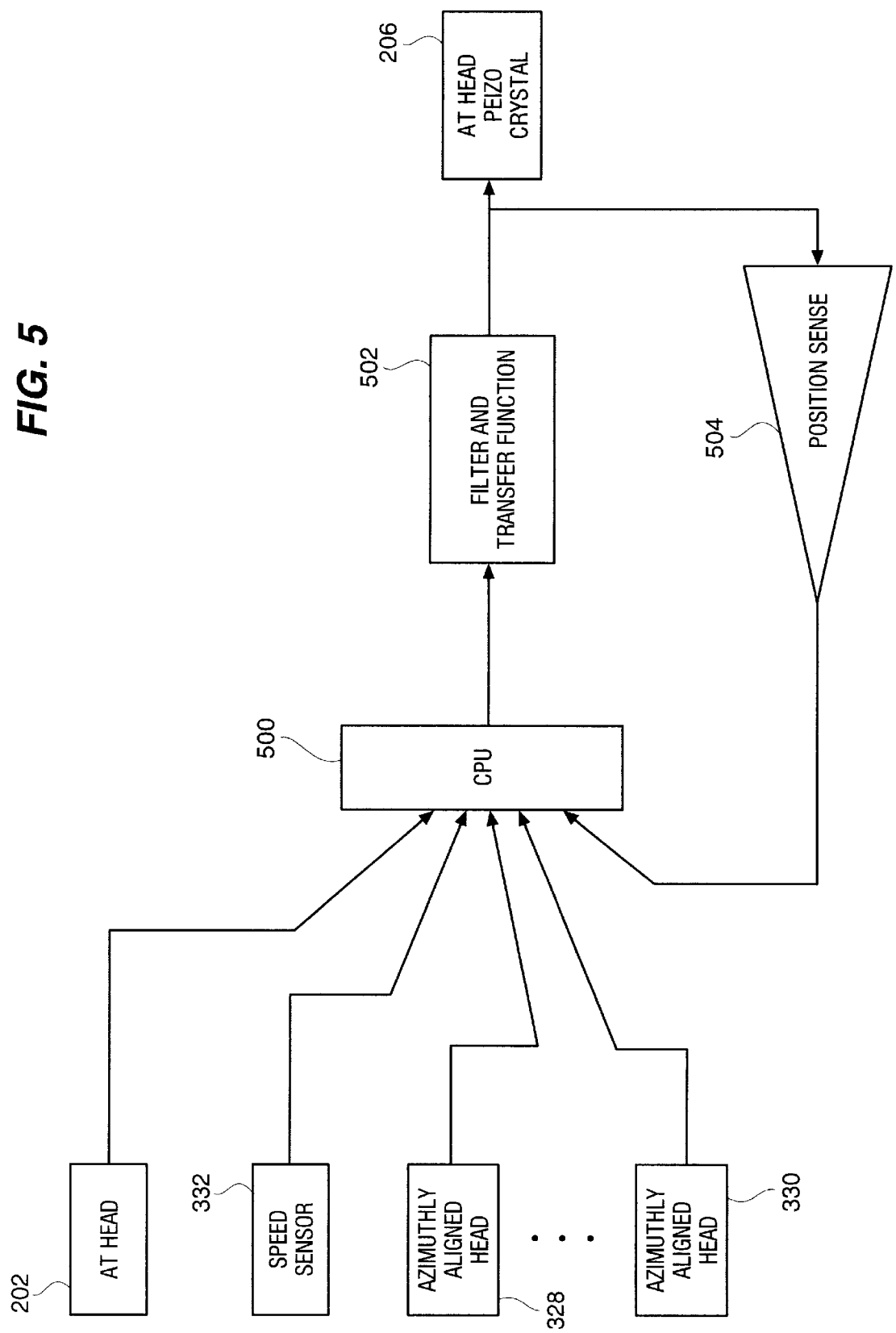

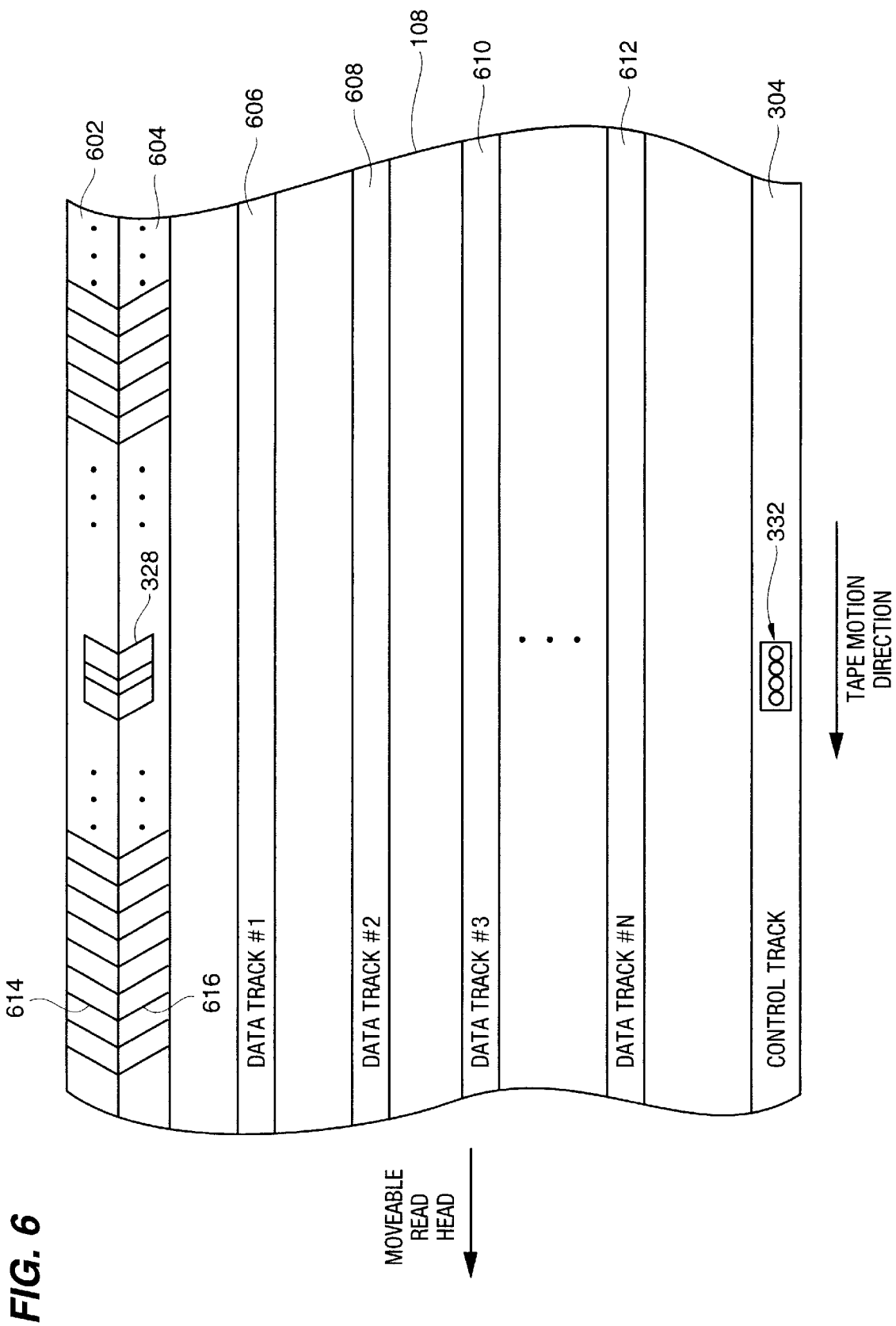

TAPE TRANSPORT SYSTEM USING VARIABLE TAPE SPEED TO ACHIEVE CONSTANT DATA SPEED AND ADVANCE DETECTION AND CORRECTION OF TRACKING ERRORS TO REDUCE DATA LOSS ERRORS

This application is a file wrapper continuation of application Ser. No. 08/547,061, filed Oct. 23. 1995, now abandoned.

FIELD OF THE INVENTION

The invention relates to tape transport devices as used in video, audio, and computer system record and playback systems. More particularly, the present invention relates to designs which improve the tracking of tape in such tape transport devices to thereby improve data recording and playback reliability and repeatability.

PROBLEM

High density, high capacity, tape transport devices require significant physical stability and repeatability of positioning of the tape medium with respect to read/write heads. Many mechanical designs are known in the art to improve the stability and repeatability of this tape positioning with respect to the read/write heads. However, even under the best known practical designs, tape positioning with respect to the read/write head is prone to error due to mechanical tolerances as well as inconsistencies in the tape medium (i.e. stretch of the substrate material or inconsistent coating of the magnetic medium).

It is known in the tape transport arts, as applied to video tape recording for example, to adjust the position of the playback (read) head to compensate for opositioning errors of the tape medium with respect to the playback head. For example, the helical scanner in the AJ-D350 VTR (a video tape recording/playback device made by Panasonic) positions its two playback heads on piezo-electric crystals (also referred to a bimorphs) so that the heads may be moved to compensate for misalignment between the head and tape positioning. The moveable heads in the D350 are referred to as "AT heads" (auto-tracking heads). The AT heads sense tracking errors while reading the video tape. Associated closed loop control logic circuits adjust the position of the AT heads to reduce the tracking error as the tape moves on to subsequent reads.

The auto-tracking correction performed by the AJ-D350 AT heads is adequate for video image playback where temporary loss of data is acceptable. When the AT heads sense that a sector of data (an audio or video sector of a track) is not properly aligned, it will adjust the AT heads position to correct the reading of subsequent data. However, the data which revealed the tracking error is lost in that it may not be correctly read depending on the severity of the tracking error. In the video/audio recording applications of such AT heads in a helical scanner, other circuits compensate for the lost data by interpolating to derive estimated data to replace the lost data. This process in the AJ-D350 is referred to as error correction and concealment. Problems arise in applying these corrective and concealment techniques taught by the AJ-D350 to computer data storage applications as distinct from video/audio recording. Computer data storage requires the correct reading of the actual, previously recorded data. Interpolation to conceal lost data is an unacceptable solution. It is therefore vital that the application of such helical scan AT heads to computer data storage applications provide for precise tracking of the tape medium with respect to the read/playback heads to avoid data loss.

A further problem in the computer data tape transport arts is the speed control of the tape medium passing over the read/playback heads. In particular, consistency of speed of the tape medium in high density helical scan tape transport applications is more critical than In standard linear tape recording techniques due to the small physical size of the tracks and matching tape heads. In addition, the helical angle of the recorded tracks demands tighter tolerances in tape motion relative to the heads to read magnetic flux changes accurately. Most high density tape transport devices therefore utilize a capstan design in which the tape speed is controlled by the accuracy of the servo control motor which drives the capstan. U.S. Pat. No. 5,402,956 (issued Apr. 4, 1995 to Lemke), is exemplary of a complex capstan design which attempts to focus accurately to maintain tape medium speed. However, a capstan (let alone three capstans) and its associated servo motor add significant complexity to a tape transport design. In addition, the capstan frictional force against the tape medium and the associated pinch roller can stretch the tape medium. As the tape medium stretches even a capstan design for tape speed cortrol cannot correct for the longitudinal stretch of data recorded on the medium.

It is evident from the above discussion that a need exists for improved control methods and associated apparatus to control the speed of recorded data passing over the read/playback heads and to correct for tracking errors in such a manner as to reduce data loss.

SOLUTION

The present invention solves the above identified problems and others, thereby advancing the state of the useful a by providing apparatus and methods for acquiring tape position and motion information pertaining to the tape medium at a position in advance of he associated tape segment passing over the playback heads. The tape position and motion information includes tape speed errors and tape tracking position errors which may generate data loss errors as the tape medium passes over the read/playback heads. Errors detected using the tape position and motion information are used to compensate the tape motion or head position as the tape moves ahead to encounter the read/playback heads. This compensation can significantly reduce the data loss errors induced by tape speed and tracking errors as compared to prior designs.

In standard tape formats, such as the NTSC helical scan tape format, information is recorded in discrete sections of tape referred to as tracks. Tracks may be continuous and aligned with the longitudinal axis of the tape medium, vertically aligned perpendicular to the longitudinal axis of the tape medium, or helically positioned at an intermediate angle between the longitudinal axis and its perpendicular. In the NTSC helical format, for example, helically aligned tracks are comprised of audio and video sectors while three linear tracks, longitudinally aligned with the tape medium, are used to record control information associated with the audio and video data.

In particular, the present invention includes a speed sensor which determines the speed of the tape as indicated by a repetitive sequence of informatlon prerecorded in a control channel which is recorded in a linear, longitudinal direction on the tape medium. The prerecorded repetitive sequence of information provides a known sequence of expected values to be sensed by an associated sensor head. Under nominal dons, the prerecorded signals on the control track are sensed at predetermined time intervals based upon the prerecorded sequence. If the physical speed of the tape medium motion is incorrect or if the tape medium is stretched or contracted, then the prerecorded sequence will be sensed at unexpected time intervals. Such sensing at unexpected time intervals indicates an error in the speed of the prerecorded sequence passing over the fixed position sensor. The tape speed as indicated by a data sequence prerecorded on a linear, longitudinally aligned control channel of the tape medium is referred to herein as the "data speed."

The prerecorded sequence of information may be as simple as a repetitive clock signal so that the data speed is sensed as pulses/bits per second. Attentively, the prerecorded sequence may be a more complex pattern, so long as the pattern is well defined as in the NTSC tape format standard. In this case the data speed is simply measured as a difference between the sensed signal sequence timing and the expected, prerecorded signal sequence timing.

Sensing data speed by sensing the prerecorded data sequence permits detection of improper speed in the tape motion as well as detection of stretch or contraction in a section of the tape medium. This data speed detection allows the tape speed to be modulated as required to compensate for tape stretch and contraction. In other words, the physical tape speed is adjusted to maintain a constant data speed to thereby correct for data loss caused by tape stretch or contraction. By way of contrast, capstan speed control systems simply maintain a constant physical speed of the tape medium regardless of any stretch or contraction of the tape medium. The data speed sensor is positioned upstream of the position at which the tape medium encounters the read/playback heads to permit compensation for the data speed error as the tape medium later encounters the playback heads.

Sensing the data speed permits the elimination of the capstan control In favor of direct control of the tape speed through control of the take-up reel servo motor. The speed sensor added in accord with the present invention enables the measurement of tape speed (as indicated by the data speed). Direct measurement of tape speed (as for example by measuring data speed) then permits the tape speed to be controlled by the servo motor driving the take-up reel. All known tape transport devices used in computer data storage include servo control of the take-up reel. Eliminating the capstan structure common to many tape devices therefore simplifies the overall design of the tape transport device by using the existing servo motor systems associated with the take-up reel of the tape subsystem.

The present invention further includes one or more stationary read heads positioned in advance of the moveable read/playback heads. The stationary read heads are aligned with the track alignment used by the record and moveable read/playback heads (i.e. linearly, vertically, or helically aligned). The heads are further azimuthally aligned with the recording azimuth offset used between adjacent channels of the recorded tracks. These stationary read heads are used to sense tape tracking errors in advance of the moveable read/playback heads. Tracking errors so sensed are correctable by control circuits and associated software which reposition the moveable read/playback heads as the misaligned tape medium passes over the moveable read/playback heads. By sensing tracking errors in advance of the tape medium passing over the moveable read/playback heads (AT heads as discussed in the AJ-D350 specifications), the heads may be adjusted without risk of data loss.

The individual features of the present invention including variable tape speed to achieve constant data speed and advance detection and correction of tracking errors each serve to reduce the data loss errors in computer data tape transport applications. These features are also coupled in a manner which suggests the combination of the features is preferable to either alone. Varying the tape speed to achieve constant data speed reduces some data loss errors but may induce additional tracking errors by virtue of changes in the tape motion. The combination of constant data speed sense and control with the advance detection and correction of tape tracking errors further reduce the potential data loss errors over that of either feature alone.

The advantages of the above and other features of the present invention will become apparent from the following description and the attached drawings.

BRIEF DESCRIPTION OF THE DRAWINGS

FIG. 4 shows a sequence of diagrams (FIGS. 4A, 4B, and 4C) describing the azimuth angle tracking sensor techniques known in the art;

FIG. 5 is a block diagram of sense and control logic which serves to adjust the moveable read heads in response to the tape position and motion sensor for tracking errors;

FIG. 6 is a diagram of another example linear recording format operable in conjunction with the tape position and motion of the present invention including an azimuthally aligned stationary read head.

DETAILED DESCRIPTION

OVERVIEW

Figure 1:
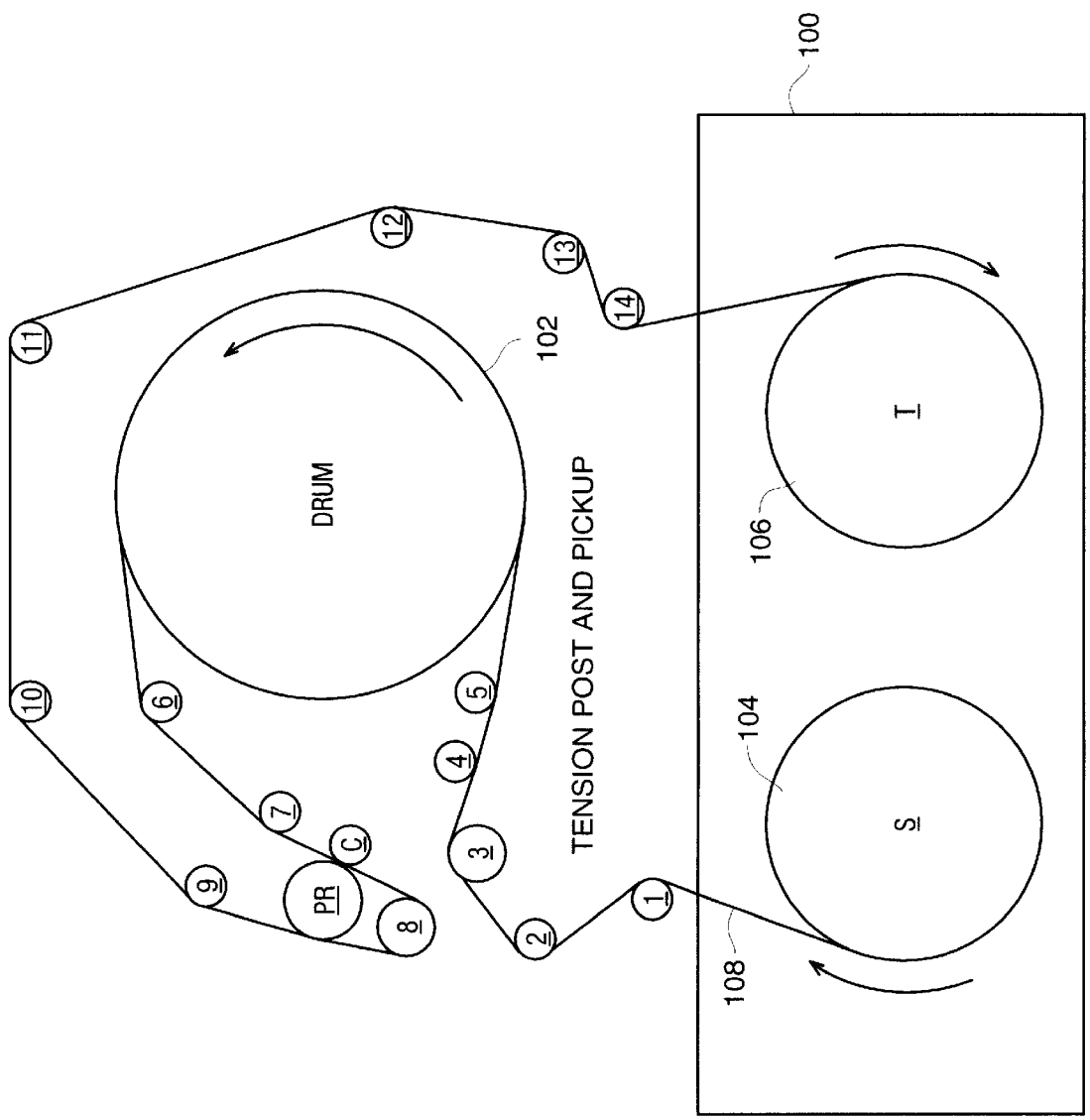
FIG. 1 shows a typical helical scan tape transport device as known in the prior art.

FIG. 1 shows a tape transport device as known in the art devoid of the improvements of the present invention. A tape cartridge 100 having a supply reel 104 and a take-up reel 106 supplies tape medium 108 for use in the read/write mechanisms of the tape transport device. Tape medium 108 is unwound from supply reel 104 and wound onto take-up reel 106 for purposes of recording information or for playing back previously recorded information. Guides 1–14 serve to direct the path of tape medium 108 through the tape transport mechanisms. Supply reel 104 and take-up reel 106 serve to maintain a desired tension in the tape medium. Guide 3 serves to provide tension through a preloaded spring bias and returns sense information to control circuits turning the supply reel 104 and the take-up reel 106. The control information is used to adjust the rotation of the reels to maintain the desired tension in tape medium 108. Tape medium 108 is threaded between capstan "C" and pinch roller "PR" which are driven to rotate at a fixed speed to thereby maintain a predetermined velocity of tape medium 108 through the tape transport mechanism.

Drum 102 rotates with record (write) and playback (read) heads attached thereto to implement helical storage record formats on tape medium 108. It is known that the playback (read) heads may be moveable to permit adjustment for tracking errors. The read/playback heads (not shown in FIG. 1) are mounted in the rotating drum 102 on piezoelectric crystals 206 (often referred to as "bimorphs") which move in response to applied electric fields. The read/playback heads (not shown in FIG. 1) sense the misalignment of tape medium 108 as they read information from the tape. FIG. 4 depicts a sequence of drawings (FIGS. 4A, 4B, and 4C) which describe this technique known to the art. The read head 400 of FIG. 4 is aligned to the azimuth angle of a pair of adjacent channels (CH0 and CH1) previously recorded on tape medium 402. An exemplary recorded signal on tape medium 402 is indicated by the angled line 404. The aligned position of the read sensors in head 400 is shown by dashed angled line 406. When the read head 400 passes over a "sync" signal recorded on tape 402 (or any predefined signal which Is identical on both adjacent channels—CH0 and CH1), the difference in signal strength and timing sensed by each channel of the read head 400 is of indicative to the tracking position of the tape 402 relative to the head 400. For example, in FIGS. 4A and 4C, the head is misaligned left and right, respectively, relative to the present position of the tape 402. In FIG. 4A, CH0 sync signal sense is advanced in time while the CH1 sync signal sense is delayed in time relative to the expected nominal timing. Conversely, in FIG. 4A, CH1 sync signal sense is advanced in time while the CH0 sync signal sense is delayed in time relative to the expected nominal timing. In each case the head 400 can be moved to compensate for the misalignment (tracking error) to improve data detection on subsequent reads. FIG. 4B depots the nominal position of the tape 402 and head 400 wherein there is no alignment error (no tracking error).

Since the read/playback head itself senses tracking errors as the adjacent tracks are read during a helical scan of a track, the heads are referred to as "AT heads" (auto-tracking heads) in the specification for the Panasonic AJ-D350 video tape recorder. This AT head design is adequate for video/audio recording applications of such a helical scan tape transport device. Though the AT heads detect tracking errors and are moved in response to the sensed errors, the head movement control occurs after the errors are sensed—too late to recover data lost by occurrence of the tracking error. This data loss is compensated in video/audio playback applications by conealing the error. An error is concealed by, for example, interpolating between preceding and following data points to estimate the value of the lost data. The lost data, after all, is only a small portion of a video image or audio signal. Estimating to conceal the lost data is likely to be unnoticed by users of the video/audio recording device. However, such data loss and core is unacceptable in computer data storage applications. In these applications it is vital to reduce the number of data loss errors that occur.

IMPROVEMENT OF PRESENT INVENTION

The present invention reduces the number of such data loss errors by sensing such errors in advance of the tape's encounter with the AT heads of the tape transport device. This tape position and motion data is gathered by sensors associated with the tape transport device and is used to adjust the moveable read/playback heads as the misaligned section of tape passes over the read head. Since the tape position and motion data is available before the associated section of tape passes over the moveable read head, the tape motion or read head position may be adjusted in advance so as to avoid data loss errors induced by the tape positioning or motion errors.

Figure 2:
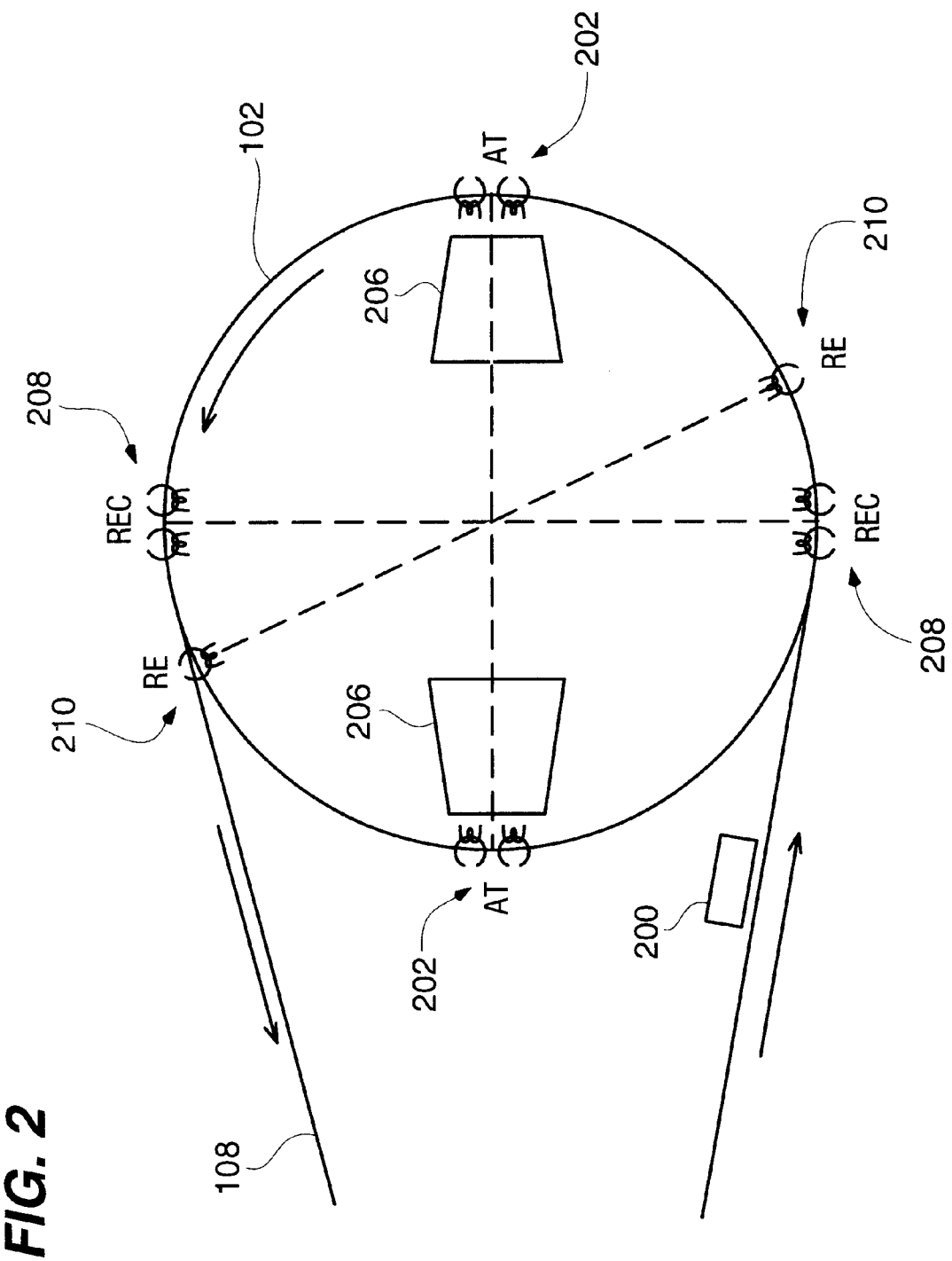
FIG. 2 shows stationary tape position and motion sensors positioned in advance of the helical scan heads in accord with the present invention.

FIG. 2 shows the positioning of stationary tape position and motion sensors 200 in advance of the position where tape medium 108 first encounters drum 102. In addition, FIG. 2 depicts additional details regarding the positioning of heads on drum 102. As a point on tape medium 108 advances toward drum 102, it first passes over stationary tape position and motion sensors 200. Sensors 200 measure various parameters regarding the position and motion of tape medium 108. For example tape position and motion sensors 200 may include sensors for determining misalignment between tape medium 108 and the read heads (AT 202 on drum 102). Further, tape position and motion sensors 200 may include sensors for determining the speed and/or direction of motion of the tape medium 108. These specific sensors are discussed in detail below.

The tape position and motion information measured by operation of sensors 200 is then used to control motion of tape media 108 or to control the position of AT heads 202 on drum 102. The control techniques applied correct the sensed error in tape motion or head position as the tape moves ahead to encounter the AT heads 202 on drum 102. Since the tape position and motion information derived by sensors 200 is available in advance of the tape medium 108 being read by AT heads 202 on drum 102, the errors may be corrected before they induce data loss at the AT heads reading of the stored data. All known prior applications of corrective techniques compensate for the errors, if at all, after the read/playback heads have sensed an error. At that time, the opportunity to avoid data loss is passed. Other heads positioned on drum 102 are used to record or erase information on tape medium 108. Specifically, RE heads 210 serve to erase information and REC heads 208 record new information on tape medium 108. As depicted in FIG. 2, these heads are not moveable. However, one of ordinary skill in the art will readily recognize that the methods and apparatus of the present invention may also be applied to operation of these recording and erasure heads.

TRACKING ERRORS

Figure 3:
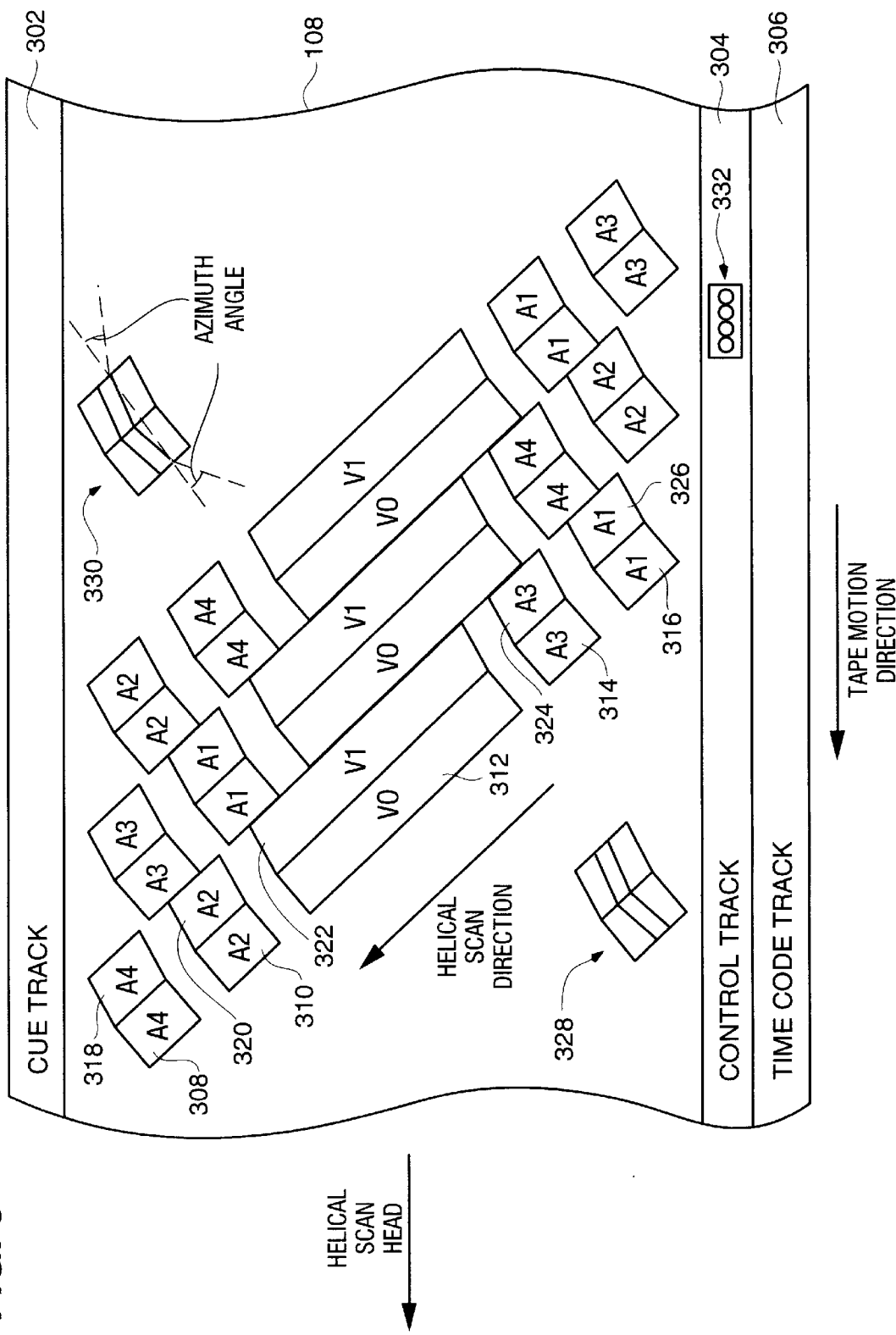
FIG. 3 is a diagram of a typical helical scan ape transport format as it interacts with the stationary tape position and motion sensors of the present invention.

FIG. 3 provides an overview of a typical helical scan format such as the NTSC industry standard used in the Panasonic AJ-D350 video tape recorder. In addition, FIG. 3 shows the relationship of tape position and motion sensors 200 embodied in sensor heads 328, 330, and 332 used in conjunction with the helical scan tape format. In the helical scan tape format depicted In FIG. 3, a track is comprised of five sectors aligned end to end in the direction of the helical scan. Two audio sectors, 308 and 310, precede a video sector 312 which is then followed by two more audio sectors, 314 and 316. These five sectors comprise a single track recorded by a first channel (channel 0 or CH0) in one of the two AT heads 202 of drum 102 in FIG. 2. A second track is recorded adjacent the first by a second channel (channel 1 or CH1) of the same AT head 202. The second track recorded by channel 1, adjacent to the track recorded by channel 0, is comprised of audio sectors 318, 320, 324, and 326 and video sector 322. The designation of audio versus video relates to the use of the format in video/audio tape recording applications and is not directly applicable to computer data storage applications of the tape media format. A plurality of such pairs of adjacent tracks comprises a field as defined by the video/audio NTSC recording standards. Three pairs of adjacent tracks are shown in FIG. 3 in accordance with the NTSC recording standards. Other helical recording standards define similar fields and groupings of the recorded information and may be similarly applied to computer data storage applications. Each sector of each track includes a SYNC portion which comprises a fixed sequence of recorded data to permit a read head to Initialize a PLL docking function.

The azimuth angle of the adjacent channels is equal but opposite as shown in FIG. 3 (mirrored about the axis where the adjacent tracks abut). Stationary read heads 328 and 330 (elements of telemetry sensors 200 of FIG. 2) each have a sensor for each of the two channels recorded on adjacent track pairs. The stationary read heads 328 and 330 are positioned in alignment with the azimuth angles of an adjacent pair of tracks (a first track written by channel 0 and its companion track written by channel 1 of the same AT head 202 on drum 102 of FIG. 2). In addition to the azimuth alignment, the stationary read heads are positioned vertically such that the two read channels on each stationary read head 328 and 330 will encounter the nominal expected position of the SYNC portion of a particular sector. Specifically, stationary read head 330 is vertically positioned to encounter the SYNC portion of the last audio sectors (the sectors closest the cue track 302, for example 308 and 318) while stationary read head 328 is vertically positioned to encounter the SYNC portion of the first audio sectors (the sectors closest the time code track 306, for example 316 and 326). The output signals generated by the two read channels of each stationary read head 328 and 330 are sampled periodically as the nominal expected position of the tape passes over the fixed position of the stationary read heads 328 and 330. Since stationary read heads 328 and 330 are fixed in their mounted positions, any misalignment of the tape medium will generate a difference in the timing and amplitudes of the sampled signals as compared to the nominal position of the tape when properly aligned. Azimuthly aligned stationary read heads 328 and 330 operate to sense misalignment as discussed above in FIG. 4 with respect to the AT heads 202 on drum 102.

Stationary read heads 328 and 330 are shown horizontally offset left and right from one another in FIG. 3 only for visual clarity. Normally, the stationary read heads 328 and 330 would be horizontally aligned with one another in a vertical column to simplify the associated alignment sense and control circuits. Or alternatively, a plurality of such stationary heads could be staggered so as to simultaneously align each head with the SYNC field of each sector in the measured track. In addition, one of ordinary skill in the art will readily recognize that a single stationary read head may be used to verify alignment or a plurality of such heads may be employed. For example, five stationary, azimuthly aligned read heads could be positioned in telemetry sensors 200 in order to verify alignment at the SYNC field of each of the five sectors of a track passing over the tape position and motion sensors. Such a plurality of sensors could be positioned aligned with the nominal position of a single recorded track. In such a position, the sensors could be used in combination to sense distortion in the helical angle of the recorded track. Tape speed adjustments could be applied during the reading of that corresponding track to correct for the distortion of the recorded track (i.e. curvature or slant in the recorded track relative to the nominal helical angle). However, this helical angle alignment of a plurality of heads would require Fe separation between the first and last hoed to be approximately five inches. This physical spacing may be impractical in many applications and therefore is not preferred. A more common preferred approach would be to align a plurality of azimuthly aligned heads in a vertical column generally perpendicular to the longitudinal axis of the tape medium. In this alignment, each azimuthly aligned head is sensing the alignment of a portion of a different track on the tape medium. The multiple sensor output signals are then combined with control circuits and associated software to sense the misalignment or distortion of each recorded track. This vertical alignment adds some complexity to the control circuits and software, but dramatically reduces the physical space required to position and mount the azinuthly aligned heads.

SPEED ERRORS

Tape position and motion sensors 200 of FIG. 2 includes speed sensor 332 of FIG. 3 which senses prerecorded signals on control track 304 of the tape medium 108. A predetermined repeating sequence of bit values is recorded on the linear control track for various timing control purposes relating to the NTSC (or other) helical scan tape format standard. The predetermined repeating sequence of bit values should be sensed at fixed points in time if the tape speed is constant and if the tape medium 108 is not stretched or contracted. If the tape speed is incorrect, or if the tape medium 108 is stretched or contracted (to thereby stretch or contract the data sectors recorded thereon), then control circuits associated with the speed sensor may alter the speed of the tape medium 108 to compensate for the tape speed error. Compensating for the tape speed error reduces the probability that the speed error will induce data loss errors as the tape medium 108 encounters the AT heads 202 on drum 102 of FIG. 2.

Speed sensor 332 actually senses the speed of predetermined data recorded on control track 304 of tape medium 108. By so doing, speed sensor 332 may sense not only tape speed errors but also errors due to stretch or contraction of the tape medium 108. As used herein, the term "data speed" refers to this feature of sensing both tape speed errors and tape medium stretch/contraction errors by sensing the speed of data in the predetermined sequence recorded on a control channel 304 of the tape medium 108. Therefore, if the predetermined sequence of bits is sensed to occur on an improper time base, then the tape medium may be physically stretched or contracted. Potential data loss due to tape medium stretch or contraction may be reduced by adjusting the tape medium speed as the stretched or contracted section of tape encounters drum 102 of FIG. 2.

Servo motors associated with a take-up reel (i.e. 106 of FIG. 1) may be controlled in response to the sensing of a tape speed error or tape stretch error to adjust the tape speed. In the alternative, a capstan servo controlled motor may be used to compensate for tape speed errors or tape stretch errors sensed by speed sense 332 of FIG. 3. Though not shown, use and control of such servo motors is well known to those of ordinary skill in the art. However, by sensing the data speed on the tape medium, the present invention permits elimination of the capstan speed control circuits in favor of direct servo control of the take-up reel 106 of FIG. 1. Since most tape transport devices already provide direct servo control of the take-up reel, the data speed sensing feature of the present invention permits elimination of the capstan related components to thereby simplify the design and costs of a tape transport subsystem.

Speed sensor 332 may be a simple single sensor to sense the bit transitions on the control track 304 of tape medium 108. Such a simple sensor permits sensing of the tape speed (data speed) only. Speed sensor 332 of FIG. 3 is shown as a quadrature sensor which acquires four samples of the predetermined data sequence. As is well known in the art, use of a quadrature sensor permits sensing of both the speed and direction of the tape motion. Use of such sensors is well known to those of ordinary skill in the art.

CONTROL LOGIC

FIG. 5 is a block diagram depicting an exemplary embodiment of control circuits and logic which implement the controlled movement of AT heads (202 on drum 102 of FIG. 2) in response to tape position and motion information indicating a misalignment or distortion of the recorded tracks on the tape medium. CPU 500 receives information regarding the operation of the tape drive with respect to the tape medium via sensors 328-332 and from AT heads 202. The azimuthly aligned read heads 328 and 330 detect the amount and direction of misalignment or distortion of the tape medium. Speed sensor 332 provides information regarding the data speed of the information passing over it. AT heads 202 detect SYNC fields in the aligned tracks an provide an indicator signal of the SYNC field to CPU 500 to indicate the timing of the recorded tracks encountering the AT head 202. Finally, the position sense circuits 504 provide CPU 500 with sense information indicative of the present position of the AT head 202 mounted on piezo-electric crystal 206.

CPU 500 determines the required adjustment to the present position of AT head 202 and applies a signal proportional thereto to fitter and transfer function element 502. Filter and transfer function element 502 are adapted to filter and shape the output signal for further application to AT head piezo-electric crystal 206. The control circuits of FIG. 5 thereby adjust the position of each AT head 202 by applying a voltage to the piezo-electric crystal 206 on which each AT head 202 is mounted.

One of ordinary skill in the control arts will readily recognize standard filter and transfer functions applicable to control of the piezo-electric crystal 206. The piezo-electric crystal 206 is modeled as a mass damper-spring mechanical system. Filter and transfer function element 502 may Include, for example, a "low-pass" or "roll-off" filter expressed in traditional Laplace transform terms as:

$$KB/(s+B)$$

A typical mass-damper-spring transfer function of the filtered control signal may be represented in traditional Laplace transform terms as:

$$1/(Ms^2+Ds+K)$$

One of ordinary skill in the process control arts will readily recognize that the appropriate "spring" parameters (M, D, K, and B) to be applied are based upon parameters of the piezo-electric crystal 206 used to move the AT heads 202.

LINEAR RECORDING EXEMPLARY EMBODIMENT

Figure 7:
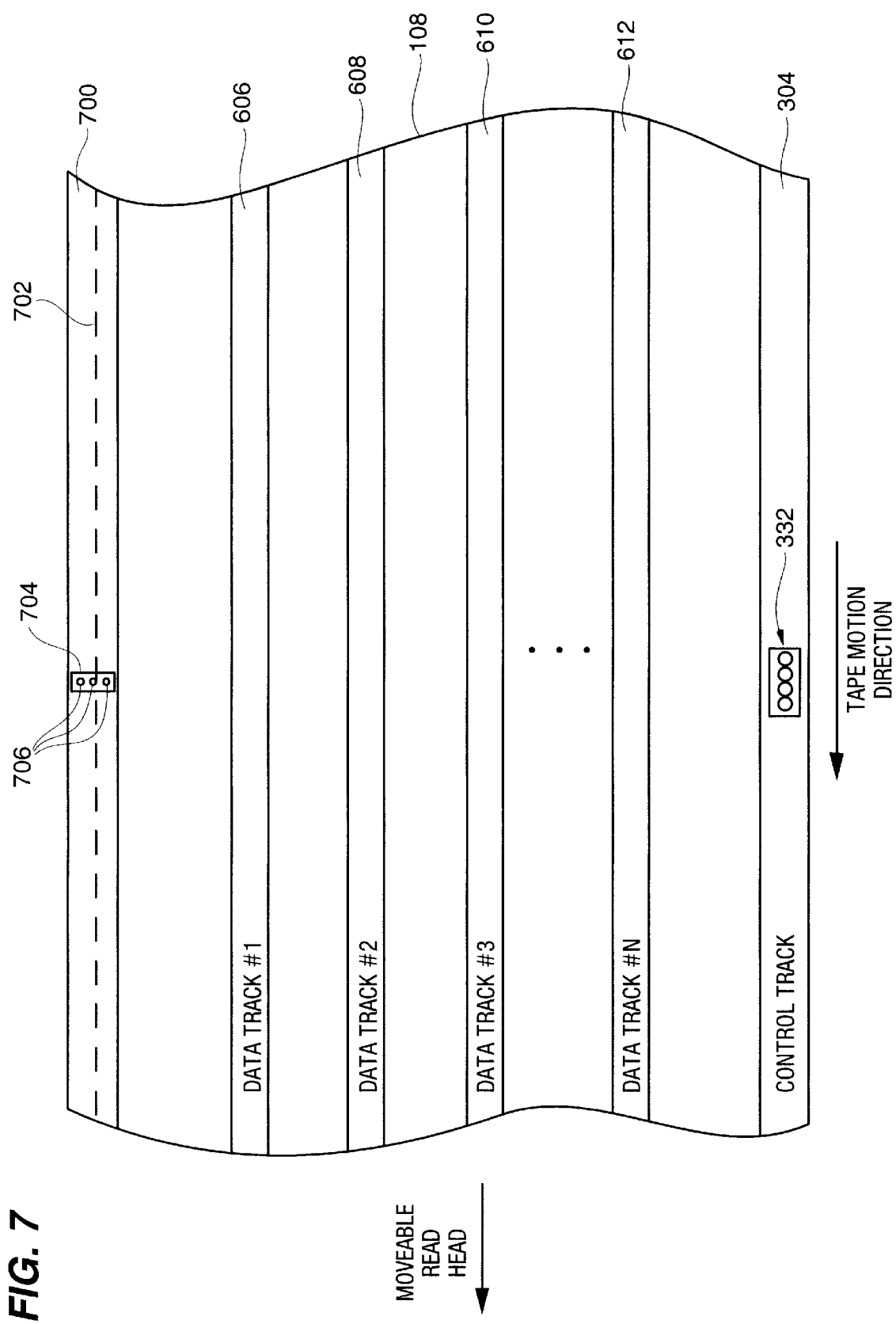
FIG. 7 is a diagram of another recording format operable in conjunction with the tape position and motion of the present invention including a stationary read head.

One of ordinary skill in the art will readily recognize that the teachings of the present invention may be applied to other recording geometries in addition to the helical scan recording discussed above. FIGS. 6 and 7 depict variants of the present invention as applied to a linear recording application for computer data tape transport devices. In FIG. 6, data tracks 1-N (606–612) are recorded linearly on the longitudinal axis of tape medium 108. As discussed above with respect to FIG. 3, a quadrature speed sensor 332 is in a stationary position (relative to the moveable read head— not shown in FIG. 6) vertically aligned with the position of the repeating sequence of information recorded in the control track 304. Speed sensor 332 serves to detect the data speed of the tape medium 108 by sensing errors in tape medium speed as well as errors induced by stretch or contraction of tape medium 108. Operation of speed sensor 332 of FIG. 6 is the same as described above with respect to FIG. 3.

Azimuthly aligned stationary read head 328 reads two channels 602 and 604 recorded with identical repeating sequences of information but having opposite azimuth angles 614 and 616 respectively. As discussed above with respect to FIGS. 3—5, the output signals of the two read channels on azimuthly aligned stationary read head 328 are indicative of the misalignment of the tape medium 108 with respect to the stationary read head 328. The output signals are utilized as discussed above with respect to FIG. 5 to control the position of the moveable read head (not shown in FIG. 6). By detecting the misalignment and data speed errors using stationary position tape position and motion sensors (i.e. read head 328 and speed sensor 332 of FIG. 6) in advance of tape medium 108 encountering the moveable read head, data loss errors may be avoided more frequently than under designs typical of the prior art.

FIG. 7 depicts yet another variant of linear recording in which acquired tape position and motion information may be applied to linear recording techniques to reduce data loss errors. FIG. 7 is identical to FIG. 6 with respect to data tracks 606–612, speed sensor 332 and control track 304. Unlike FIG. 6, alignment track 700 has a single sequence of repeating data patterns 702 which is sensed by alignment sensor 704. Alignment sensor 704 includes three individual sensors which in combination sense whether the tape medium 108 is vertically aligned for its upcoming encounter with the moveable read head (not shown in FIG. 7). If tape medium 108 is vertically aligned, the output signal generated by the middle of the three sensors 706 will be stronger than the other two as the prerecorded track 702 passes under it, and the other two sensors 706 (top and bottom) will generate output signals of nearly equal amplitude less than that of the middle sensor. Conversely, if tape medium 108 is misaligned vertically with respect to alignment sensor 704, the output signals of the top and bottom sensor 706 will be unequal and one of the two will approach or surpass the output signal level of the middle sensor 706. The larger of the two output signals as between the top and bottom sensor 706 indicates in which direction the tape medium 108 is misaligned.

While the invention has been illustrated and described in detail in the drawings and foregoing description, such illusion and description is to be considered as exemplary and not restrictive in character, it being understood that only the preferred embodiment has been shown and described and that all changes and modifications that come within the spirit of the invention are desired to be protected.

What is claimed is:

1. In a tape transport device having a moveable read head, an apparatus for reducing data loss errors induced by physical defects in said tape medium and mechanical misalignment of said tape medium which is loaded in said tape transport device, with said movable read head, said apparatus comprising:

means located in advance of said movable read head for reading motion and position data of a portion of said tape medium;

means for detecting a physical defect in said portion of said tape medium from said position and motion data read from said portion of said tape medium in advance of said portion of said tape medium encountering said moveable read head;

means for determining misalignment of said tape medium with said movable read head from said position and motion data in advance of said portion of said tape medium encountering said movable read head;

means for adjusting the speed of said tape over said movable read head in response to a determination of a physical defect in said portion of said tape medium; and control means, responsive to a determination of a misalignment of said portion of said tape medium with said movable read head, for adjusting the position of said moveable read head in said tape transport device to reduce data loss errors.

2. The apparatus of claim 1 wherein said position and motion data comprises a prerecorded signal on said tape medium in said tape transport device and said means detecting reads said prerecorded signal to determine the speed of said portion of said tape medium.

3. The apparatus of claim 1 wherein said tape transport device comprises an uptake reel connected to said tape medium and said means for adjusting said speed comprises means for controlling rotational speed of a take-up reel connected to said tape medium in said tape transport device.

4. The apparatus of claim 1 wherein:
said telemetry acquisition means includes quadrature sense means for determining errors in the speed and direction of said tape medium in said tape transport device; and
said control means includes speed control means for adjusting the speed of said tape medium in said tape transport device.

5. The apparatus of claim 4 wherein said quadrature sense means comprises means for sensing a prerecorded signal on said tape medium in said tape transport device.

6. The apparatus of claim 4 wherein said speed control means comprises means for controlling rotational speed of a take-up reel connected to said tape medium in said tape transport device.

7. The apparatus of claim 1 wherein:
means for determining said misalignment includes tracking means for sensing tracking errors of said read portion of said tape medium in said tape transport device from said read motion and position data; and
said control means includes head adjustment means for adjusting the position of said moveable read head to compensate for said tracking errors.

8. In a tape transport device moving a tape medium over a moveable read head, a method for reducing data loss errors induced by physical defects of said tape medium and mechanical misalignment between said tape medium which is loaded in said tape transport device and said movable tape head, said method comprising the steps of:
reading position and motion data from a portion of said tape medium in advance of said portion of said tape medium encountering said movable read head
detecting a physical defect in said portion of said tape medium from said read position and motion data in advance of said portion of said tape medium encountering said moveable read head;
determining said portion of said tape medium and said movable head are misaligned from said read position and motion data in advance of said portion of said tape medium encountering said movable read head;
adjusting, responsive to a determination of said physical defect in said portion of said tape medium, a speed of said portion of said tape medium over said movable read head in advance of said tape medium encountering said movable read head;
adjusting, responsive to a determination of said misalignment, a position of said movable read head to reduce data loss errors.

9. The method of claim 8 wherein said step of detecting said physical defect in said tape includes sensing a prerecorded signal in said position and motion data read from said portion of said tape medium in said tape transport device.

10. The method of claim 8 wherein said step of adjusting the speed includes controlling rotational speed of a take-up reel connected to said tape medium in said tape transport device.

11. The apparatus of claim 8 wherein:
said step of determining includes determining errors in the speed and direction of said tape medium in said tape transport device; and
said step of adjusting includes adjusting the speed of said tape medium in said tape transport device.

12. The apparatus of claim 11 wherein said step of determining errors include sensing a prerecorded signal on said tape medium in said tape transport device.

13. The apparatus of claim 11 wherein said step of adjusting the speed includes controlling rotational speed of a take-up reel connected to said tape medium in said tape transport device.

14. The method of claim 8 wherein:
said step of determining said misalignment includes sensing tracking errors of said tape medium in said tape transport device from said read position and tracking errors; and
said step of adjusting includes adjusting the position of said moveable read head to compensate for said tracking errors.

15. In a tape transport device having a moveable read head, an apparatus for reducing data loss errors induced by physical defects in a tape medium and a misalignment of said tape medium which is loaded in said tape transport device and said movable read head, said apparatus comprising:
a stationary read head in contact with said tape medium and positioned in said tape transport device in advance of the position where said tape medium encounters said moveable read head for reading motion and position data from said tape medium;
means for determining said misalignment of said tape medium and said read head in advance of said tape medium encountering said movable tape head;
means for generating a misalignment signal responsive to a determination of said misalignment;
control means, responsive to said misalignment signal, for moving said moveable read head to compensate for the misalignment of said tape medium with respect to said moveable read head;
means for detecting a physical defect in said tape medium from said read motion and position data;
means for generating a defect signal responsive to a determination of said physical defect in said tape medium; and
said control means being effective to control movement of said tape medium over said movable read head to compensate for said physical defect in said tape medium responsive to said defect signal.

16. The apparatus of claim 15 wherein said motion and position data comprises sync fields prerecorded in portions of adjacent tracks of said tape medium at opposite azimuth angles to the longitudinal axis of said adjacent tracks, said stationary read head comprising:
a read head adapted to sense said sync fields in said adjacent tracks, wherein said stationary read head is aligned with each of said opposite azimuth angles of said adjacent read tracks.

17. The apparatus of claim 15 wherein said motion and position comprises a predetermined repeating sequence of information prerecorded in a longitudinally aligned track of said tape medium, and wherein said means for detecting comprises:
means for sensing said predetermined repeating sequence in said motion and position data to generate a signal;
means responsive to generation of said signal for determining the data speed of said tape medium; and
means responsive to the determination of said data speed of said tape medium to adjust the speed of motion of said tape medium in said tape transport device.

* * * * *